United States Patent [19]
Bohrer et al.

[11] Patent Number: 6,106,569
[45] Date of Patent: Aug. 22, 2000

[54] METHOD OF DEVELOPING A SOFTWARE SYSTEM USING OBJECT ORIENTED TECHNOLOGY

[75] Inventors: Kathryn Ann Bohrer, Austin, Tex.; James E. Carey, Rochester, Minn.; Brent A. Carlson, Sollentuna, Sweden; Timothy Graser, Rochester, Minn.; Anders Nilsson, Hagan, Norway; John M. Vlissides, Mohegan Lake, N.Y.

[73] Assignee: International Business Machines Corporation, Armonk, N.Y.

[21] Appl. No.: 09/038,024

[22] Filed: Mar. 11, 1998

[30] Foreign Application Priority Data

Aug. 14, 1997 [EP] European Pat. Off. .............. 97114041

[51] Int. Cl.⁷ ..................................................... G06F 9/44
[52] U.S. Cl. .................. 717/1; 705/7; 707/104; 707/103; 707/203; 709/316
[58] Field of Search .............................. 705/1, 7, 30, 35; 707/1, 102, 103–104, 100, 203, 200; 717/1; 709/300, 309, 316, 332

[56] References Cited

U.S. PATENT DOCUMENTS

| | | | |
|---|---|---|---|
| 5,574,898 | 11/1996 | Leblang et al. | 707/1 |
| 5,671,360 | 9/1997 | Hambrick et al. | 705/9 |
| 5,787,283 | 7/1998 | Chin et al. | 395/701 |
| 5,787,425 | 7/1998 | Bigus | 707/6 |
| 5,836,011 | 11/1998 | Hambrick et al. | 705/8 |
| 5,873,097 | 2/1999 | Harris et al. | 707/203 |

OTHER PUBLICATIONS

Glenn Andert, "Object Frameworks in the Taligent OS," Digest of Papers of Comson Spring '94, pp. 112–121, Feb. 28, Mar. 4, 1994.

*Primary Examiner*—Tariq R. Hafiz
*Assistant Examiner*—Tuan Q. Dam
*Attorney, Agent, or Firm*—Matthew J. Bussan

[57] ABSTRACT

A method of developing a software system using Object Oriented Technology and frameworks. The problem of allowing an object to acquire and lose ability and function and to modify responsibilities on an object dynamically or, in other words, to allow an object to acquire and lose the ability to do things dynamically, is addressed. This problem is solved with a framework to be used for developing a software system, e.g. for a business application. The framework comprises a number of classes which are to be processed by a computer system. The framework further comprises a Life Cycle as a description of state transitions through which an object can proceed as it is processed by an application. This is applicable in the technical field of application development of software systems, e.g. for a business application as Financial or Logistic and Distribution, wherein it is the purpose of frameworks to provide significant portions of the application that are common across multiple implementations of the application in a general manner, easy to extend for specific implementation.

5 Claims, 7 Drawing Sheets

METHOD OF DEVELOPING A SOFTWARE SYSTEM USING OBJECT ORIENTED TECHNOLOGY

CROSS-REFERENCE TO RELATED APPLICATIONS

The present application is related to the following co-pending applications, filed concurrently with and assigned to the same assignee as the present application, and which are incorporated herein by reference:

U.S. Ser. No. 09/038,352, by Brent Carlson et al., entitled "A METHOD FOR USING DECOUPLED CHAIN OF RESPONSIBILITY".

U.S. Ser. No. 09/038,351, by James Carey et al., entitled "FRAMEWORK FOR BUSINESS APPLICATIONS PROVIDING FINANCIAL INTEGRATION".

U.S. Ser. No. 09/038,349, by James Carey et al., entitled "FRAMEWORK FOR BUSINESS APPLICATIONS USING CACHED AGGREGATE AND SPECIFICATION KEY".

U.S. Ser. No. 09/038,025, by James Carey et al., entitled "SOFTWARE BUSINESS OBJECTS IN A MULTI-LEVEL ORGANIZATIONAL STRUCTURE".

U.S. Ser. No. 09/041,114, by Brent Carlson et al., entitled "METHOD OF ERROR HANDLING IN A FRAMEWORK".

U.S. Ser. No. 09/038,381, by Anders Nilsson, entitled "METHOD OF LOCATING SOFTWARE OBJECTS IN DIFFERENT CONTAINERS".

BACKGROUND OF THE INVENTION

1. Field of the Invention

The present invention relates to a method of developing a software system using Object Oriented Technology and frameworks.

2. Description of the Related Art

In order to maintain or enlarge their competitiveness, enterprises of almost every type of business all over the world have to rework and bring up to date their information technology to meet customer's requirements and thus to be successful in the market. But keeping an information system based on traditionally developed software up to date is at least an expensive undertaking, and in many cases it is an unsolvable problem. Object Oriented Technology or simply Object Technology, often abbreviated "OOT" or simply "OT", has the technical potential to overcome the problems associated with development, maintenance, and extension of software applications within a company's information system and to provide interoperability and adaptability across multiple applications and hardware platforms.

Object Oriented Technology describes a method for the development of operating software as well as application software for a computer system. Contrary to the traditional, non object oriented ways of developing software, Object Oriented Technology comprises and uses preengineered "methods" and "objects" for the development of software, comparable to tools and parts for the development of an automobile.

Similar to the development of an automobile, wherein not each required screw is developed individually, but standardized screws are used which can be individually adapted by shortening to the required length, within the development of software, Object Oriented Technology provides a "class" as a kind of software template from which individual "objects" can be instantiated. These classes are usually stored in a software library or a so called "class library". A class library is simply a collection of several classes stored together in a special filing format called a library.

In Object Oriented Technology an "object" is a self-contained piece of software consisting of related data and procedures. Data means information or space in a computer program where information can be stored, e.g. a name or an inventory part number. Procedures are parts of a program that cause the computer to actually do something, e.g. the parts of a program which perform calculations or the part of a program that stores something on a computer disk. In Object Oriented Technology, an object's procedures are called "methods".

The concept of an object being a self-contained piece of software having data and procedures inside itself is a new way of developing software. In non object oriented software, most of the data for an entire program is often grouped together near the beginning of the program, and the procedures then follow this common pool of data. This conventional method worked okay for smaller programs, but as soon as a piece of software started to grow and become somewhat complex, it become increasingly difficult to figure out which procedures were using which data. This made it quite difficult and expensive to debug or change traditional software programs.

In Object Oriented Technology it is generally easier to debug, maintain, and enhance object oriented software. The three most popular object oriented programming languages are probably "C++", "JAVA", and "Smalltalk". The concept that both data and methods are contained inside an object is called "encapsulation". Part of the concept of encapsulation is that an object has a predictable way of communicating with other objects, a so called predictable "interface" or sometimes also called the method contract.

Provided that interface will not be changed, the code or methods inside the object can be changed without disrupting other objects' ability to interact with that object. For example, a TAX CALCULATION object would have a predictable interface for use by PAYCHECK objects. Provided that interface will not be changed, the detailed program code inside the TAX CALCULATION object could be changed whenever the tax laws changed, and no other objects in the payroll system would have to know anything about such changes.

In Object Oriented Technology the term "inheritance" is used to communicate the concept that one object can inherit part of its behavior and data from another object, e.g. since an employee is a type of person, an EMPLOYEE object might inherit the characteristics of a PERSON object, such as having name, birth date, and address data, as well as an EMPLOYEE object might inherit methods for updating and displaying these data.

Even if an object inherits some of its characteristics from other objects, that object can, and usually would, also have its own non-inherited characteristics, e.g. whereas a PERSON object would have an inheritable method to display a person's address, a PERSON object would probably not have a method for displaying paycheck history, since not all persons get paychecks. Because an EMPLOYEE object could not inherit this method from a PERSON object, an EMPLOYEE object would have to define its own method for displaying paycheck history.

Although Object Oriented Technology clearly seems to be the most sophisticated way for the development, maintenance, and extension of software applications, many companies developing software applications are concerned about the cost and risks involved with the rework of existing applications and with the construction of new applications using Object Oriented Technology. For those software application developers, a technical foundation for software applications has to be built as a tool using Object Oriented Technology as the basis, allowing each developer to develop highly unique software products. This technical foundation is formed by frameworks comprising the basic application structure which software application developers previously had to develop by themselves.

In Object Oriented Technology the term "framework" is used to describe a reusable set or collection of classes which work together to provide a commonly needed piece of functionality not provided by any of the individual classes inside the framework. Thus a framework defines a specific way in which multiple objects can be used together to perform one or more tasks which no single object performs. In other words, a framework is a reusable, predefined and preengineered bundle of several objects which address a recurring programming problem.

Frameworks provide a way of capturing a reusable relationship between objects, so that those objects do not have to be reassembled in that same relationship every time they are needed. Frameworks provide a way of grouping multiple objects together to perform some function which should not have to be thought through each time at the underlying object level. For example, a PRINT framework would consist of all the objects necessary for a programmer to easily print something on any printer, and would probably include objects for printer selection, spooling to disk or error detection as "out of paper". Frameworks can be regarded as an group of software objects which contain a technical foundation for a software application. For example in the business field of Financial, Logistic and Distribution or Production. Although a framework represents a skeleton of a software application, usually a framework is not an executable software program.

By providing frameworks as the technical foundation for developing software applications, the following problems have to be addressed:

Applications have to support all hardware platforms and related software operating systems relevant on the market. Applications have to fulfill the requirements related to client/server configurations including the requirement for graphical user interfaces and windowing techniques. Also, applications have to offer internet compatibility and access on demand. Furthermore applications have to provide integrated solutions with respect to installed software.

In particular, as an object within a framework progresses through processing and states there arises the requirement to modify the object, to modify existing abilities of the object or to provide new abilities for the object. For example, as a sales order is processed, its responsibilities change, e.g. only after a sales order is confirmed, it can be printed. A print method could be provided on the sales order, however its contract would be very weak.

As objects change their behavior while they are used in a dynamic and flexible manner, the changes have to be added, removed or suspended temporarily. This requirement can be solved by using a composite object which delegates the behavioral requests via a chain of responsibility across the objects making up the composite. However, traversal of the objects is very inefficient, especially when the objects making up the composite are in a client/server environment and must be transported on each usage, or when a behavior is not supported (all objects in the composite have to be visited), or because a list of all supported behavior is needed.

In addition, JAVA objects do not change behavior dynamically but still follow the chain of responsibility concept for method invocation.

For the creation of objects, an abstract factory can be used, see e.g. E. GAMMA et al: "Design Patterns: elements of reusable object-oriented software", Addison-Wesley, 1995, ISBN 0-201-63361-2. This use of an abstract factory causes the developer creating objects, in particular in a JAVA-based client/server environment, to have to deal with significant complexities, including managing "type safety", including being aware of the JAVA interface and implementation class that together make up the implementation of a business object class in a JAVA based client/server environment, guaranteeing uniqueness of object identity, ensuring proper object ownership, and determining the location of a persistent object.

Within the accompanying figures, representation standards for classes, objects, relationships etc. are used at least partly according to Grady Booch: "Object-Oriented Analysis and Design with Applications", second edition, The Benjamin/Cummings Publishing Company, Inc., Redwood City, Calif., USA.

OBJECT OF THE INVENTION

It is an object of the present invention to provide a technical foundation for the development of software applications using Object Oriented Technology which overcomes the above discussed problems.

It is a further object of the present invention to allow an object, either singly or within a tree structure, to acquire and lose ability and function or, in other words, to allow an object to acquire and lose the ability to do things.

It is a further object of the invention to solve the problems related with the delegation of behavioral requests of composite objects.

It is another object of the present invention to provide an object creation model which overcomes the drawbacks described above related to the creation of objects, in particular which provides "type safety", guarantees uniqueness of object identity, ensures proper object ownership, and determines persistent object location.

SUMMARY OF THE INVENTION

The present invention solves this object with methods and apparatus as laid down in enclosed independent claims. Particular embodiments of the present invention are presented in the respective dependent claims.

In particular, the present invention provides a framework to be used for developing a software system, e.g. for a business application. The framework comprises a number of classes which are to be processed by a computer system. The framework further comprises a Life Cycle as a description of state transitions through which an object can proceed as it is processed by an application.

In other words, Life Cycle describes the means by which the change is driven to the object, like an engine sitting off to the side which interacts with the object and causes it to make the change. The Life Cycle Pattern allows an item to go through a set of states controlled by a user defined Life Cycle. As the item progresses through the Life Cycle, the processing supported by the item is changed. The Life Cycle can be understood as a description of the state transitions including optional state and behavior through which a Life Cycle managed object can proceed as it is processed by the application.

In a preferred embodiment of the present invention the Life Cycle is defined to add and remove interface, change existing interface behavior, and add and remove data on the object.

In a further preferred embodiment of the present invention multiple alternative Life Cycles are defined which can be applied to the objects of a particular class and which may add states, remove states, and reorder state transitions. Also, new states not provided by the framework may be created and added to an existing Life Cycle.

The present invention also provides a framework comprising an "Extensible Item" feature allowing an interface of the object to be broken into logical dynamically changing pieces, which appears to be dynamic inheritance. What would have normally been the mix-in interfaces on the Extensible Item become, according to the present invention, the interfaces on the extensions. The Extensible Item feature describes the fact that the object can make the change. This provides a maximum amount of flexibility with respect to the interface of the object. Furthermore it is possible to add and even to hide interface and attributes.

Furthermore, when an Extensible Item must be processed in a true polymorphic manner, i.e. it must share a base class with other non-Extensible Item classes, this pattern can be extended by associating a Mix-In adapter instance, which inherits from the polymorphic base class, with an extension contained by the Extensible Item. The Mix-In adapter invokes requests against the Extensible Item to process its supported functions.

In a particular embodiment in a client/server environment, the Extensible Item and all of its extensions are not brought over to the client. Instead of this, the operation is sent to the Extensible Item on the server portion of the client/server environment for processing. Since an erroneous request will simply appear to be an unsupported request, it will be more difficult to debug these situations. Therefore, in a preferred embodiment of the present invention a trace request is provided which traces the processing of the request.

In a further embodiment Extensible Items may be configured in a tree structure. A special Extensible Item may then pass responsibility for a method invocation to its children or parent if it is unable to handle the request itself. This has the added advantage of allowing default behavior to be implemented on a parent Extensible Item, which all children then have access to. It also introduces the ability to broadcast a request to all children of an Extensible Item, thus ensuring that all child objects are affected by the request.

Since the support for dynamically handling a request via a chain of responsibility will be slow, the present invention also provides a framework comprising a Dynamic Virtual Function Table (DVFT) for caching, in a top object visible to a client, information on the behavior methods supported by a composite object, wherein the Dynamic Virtual Function Table (DVFT) comprises a map from the behavior as method names to the object in the composite which supports the behavior.

The problem related to the creation of objects is solved by creating an object using a static create method defined on a factory class, one of which is implemented for each framework class. This static method is used by the client to create object instances which conform to the requirements of the framework, including type safety, identity uniqueness, object ownership, and persistent location. The client is not aware of the complexities involved to ensure conformance; instead, the client sees only a single interface which returns an object of the expected type.

DETAILED DESCRIPTION OF THE PREFERRED EMBODIMENT

Figure 1:
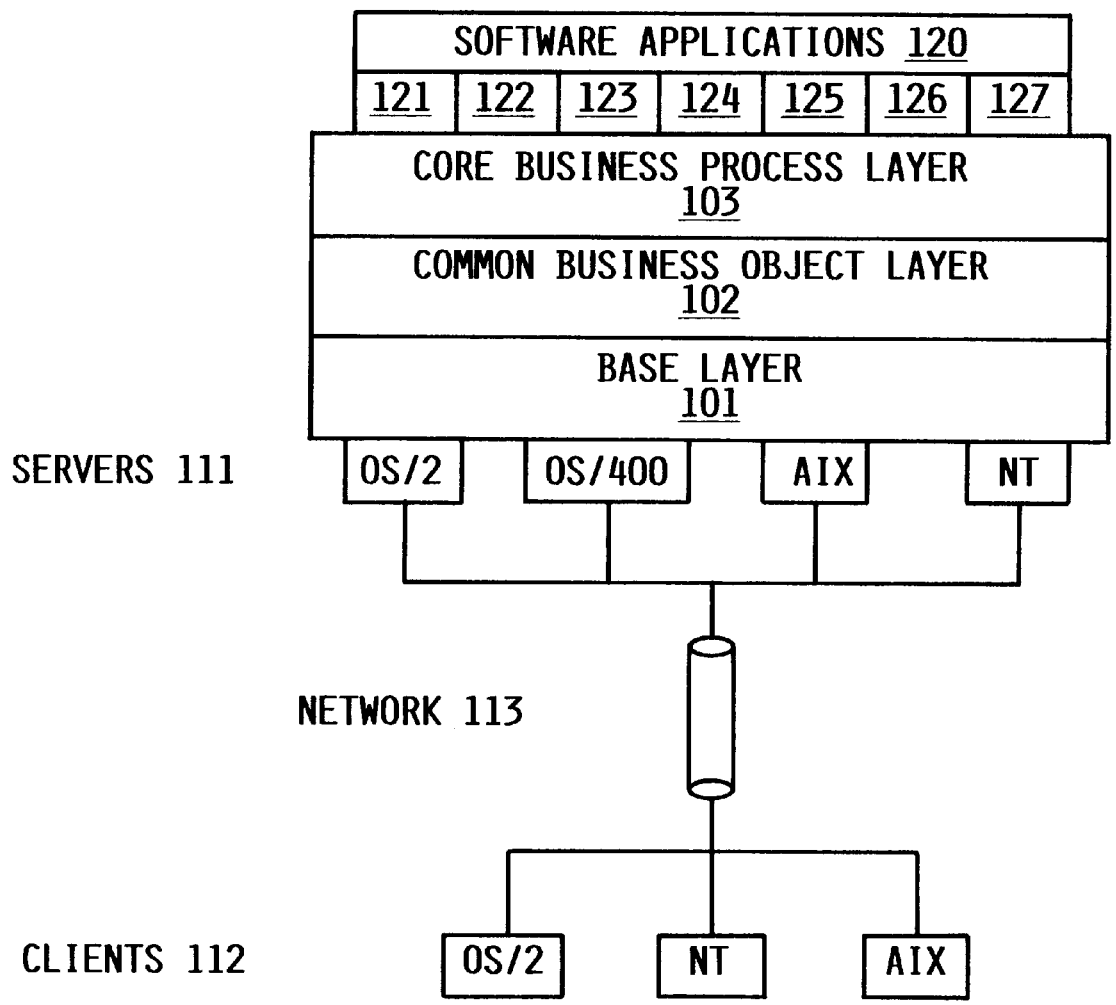
FIG. 1 shows a four layer scheme from which software applications can be developed using the present invention.

Developing software applications using the subject of the present invention as a development tool can be regarded as built up of three layers as shown in FIG. 1.

The lowest layer is the Base layer 101. The Base layer 101 provides and manages the interface with the server hardware 111 which is potentially running under different operation systems such as OS/2, OS/400, AIX, and NT. The server hardware 111 is connected with client hardware 112 via a communication network 113. The client hardware 112 may also potentially be running under different operation systems such as OS/2, NT, and AIX. The embodiment shown in FIG. 1 shows the development of the server portion of a client/server application only.

The Base layer 101 represents the technical foundation for the higher level objects including many functions near to an operating system such as finding objects, keeping track of their names, controlling access to them, resolving conflicts, security administration, and installation. The Base layer 101 also includes the so called Object Model Classes which provide a consistent model for building objects while hiding the complexity of the underlying infrastructure from the software application developer. The Base layer 101 can be regarded as a kind of lower middleware necessary for the application of the Object Technology above it using the interface functionality provided by the Base layer 101.

Above the Base layer 101 there is a layer 102 comprising Common Business Objects. This Common Business Object layer 102 provides a large number of objects which perform functions commonly needed within a business application, e.g. date and time, currency, address, units of measure, and calendar. These Common Business Objects represent the building blocks from which software application developers can select and create business applications, e.g. these Common Business Objects can be copied and extended to perform new functions, as for example the date and time object can be extended to handle the Chinese calendar.

The layer 103 above the Common Business Objects layer 102 already comprises Core Business Processes and can be regarded as the Core Business Process layer 103. Although layer 103 usually does not provide executable code, within this layer 103 the business software applications developed using the present invention begin to take shape. Each Core Business Process layer is built for one specific type of application, as for example General Ledger or Warehouse Management.

This Core Business Process layer 103 can be regarded as an upper middleware which although not a complete software application program—already contains the basic functions which all of the application programs of this type require. It is the Core Business Process layer 103 which creates the application frameworks, wherein some of the Common Business Objects are linked to a large number of objects specific to the type of framework being built, e.g. Warehouse Management. The resulting framework is constructed in a way to contain commonly used functions as well as to be easy to extend.

On top of the above described three layer model the application software is located, created by the software application developer and representing executable code. It is the choice of a software application developer whether to use only the Base layer 101, the Base layer 101 and the Common Business Object layer 102, or all three layers 101, 102, and 103 for the development of his software application. In every case he has to develop a remaining part of the application by himself and therefore every resulting software application program will be a completely unique product.

It has to be noted that the subject of the present invention is represented within the three layer model 101, 102, and 103 and is not represented by the executable code of the software application 121 developed using the present invention.

Figure 2:
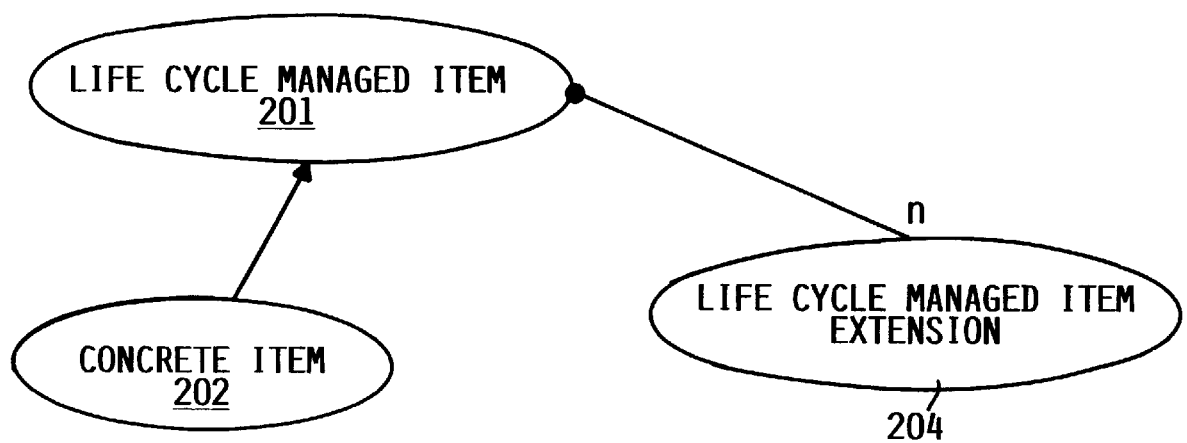
FIG. 2 shows a representation of the Life Cycle pattern from the Life Cycle managed item perspective.

FIG. 2 shows a representation of the Life Cycle pattern from the Life Cycle managed item perspective. The requests supported by a Life Cycle managed item 201 are provided by the concrete item 202, and its set of concrete extensions 204. Conceptually, the Life Cycle managed item 201 processes a request firstly giving it to each of the concrete extensions 204 in the order newest to oldest, and finally to itself. Only the first one that can handle the request is given the opportunity. The request support provided by the concrete item 202 is permanent. Note that this support can be hidden by any of the concrete extensions 204, if a request is used to access them. An extension 204 may also be used to replace or disable an operation on another extension.

Direct calls to methods on the concrete item 202 can be done if they are guaranteed never to change their behavior as the concrete item 202 goes through its Life Cycle. The request support provided by the concrete extensions is cumulative, i.e. they provide a dynamic mix-in capability. Request processing can use the conditions and/or extensions on a Life Cycle managed item as input to control what the request does.

A request may add or remove conditions from the Life Cycle managed item via a condition identifier. This identifier is used by the Life Cycle to retrieve a condition object. When the set of condition objects on a Life Cycle managed item changes, the Life Cycle may then add or remove concrete extensions from the Life Cycle managed item, thus varying the behavior that the Life Cycle managed item supports. In this way, the Life Cycle serves as a factory for the Life Cycle managed item's conditions and extensions, further isolating the various extensions from each other and increasing the reusability of those extensions. This allows a complicated state machine to be implemented as simpler decoupled, but interrelated state machines.

The Life Cycle pattern can be applied for example to an order item. Upon request, the order item is associated with a particular Life Cycle. The order item must retrieve its initial extensions from this Life Cycle. Subsequent state transitions are also retrieved from this Life Cycle. For this example a simplified "standard" Life Cycle for order items will be used. These Life Cycles will be built from states, some of which are as follows:

"confirmable"

In this state, the order item can be confirmed. Supported is the operation "print confirmation".

"pickable"

In this state, a pick list can be printed for the order item. Supported is the operation "print pick list".

"pick confirmable"

In this state, the pick list for the order item can be confirmed after picking has been completed. Supported is the operation "confirm pick list".

These states can be combined in different ways to create alternative order item Life Cycles instances, for example a new instance might combine "confirmable", "pickable", and "pick confirmable", so that confirmation can be printed only once. These instances are supported by combining various condition and extension objects.

Initialization of the order item involves the order item going to the Life Cycle and getting anywhere from zero to many initial extensions. An extension can add zero or more attributes to the order item. If it adds an attribute, it provides support for the operations to get and set the added attributes. Typically the storage for the added attributes will be supplied by the extension, but this is not required. Because extensions contain data, a new extension is created and added to the order item. The ability to accept an operation is directly related to the methods on the class attempting to process the operation. In order for a class to accept a "do this operation", it must have a "do this method".

In the example, when the order item is created, the Life Cycle inserts the initial extension "confirmable". When the client invokes a "print confirmation" operation, this causes the "confirmable" extension to add a condition to the order item. The Life Cycle inspects this condition and determines that the extension "pickable" should be added to the order item. Other Life Cycles could be configured to add a different extension or different extensions to the order item, or to not modify the order item. Thus, the extension behavior is isolated from the specific state transition behavior of the order item, enabling a single concrete extension to be used in many different Life Cycles without change.

Figure 3:
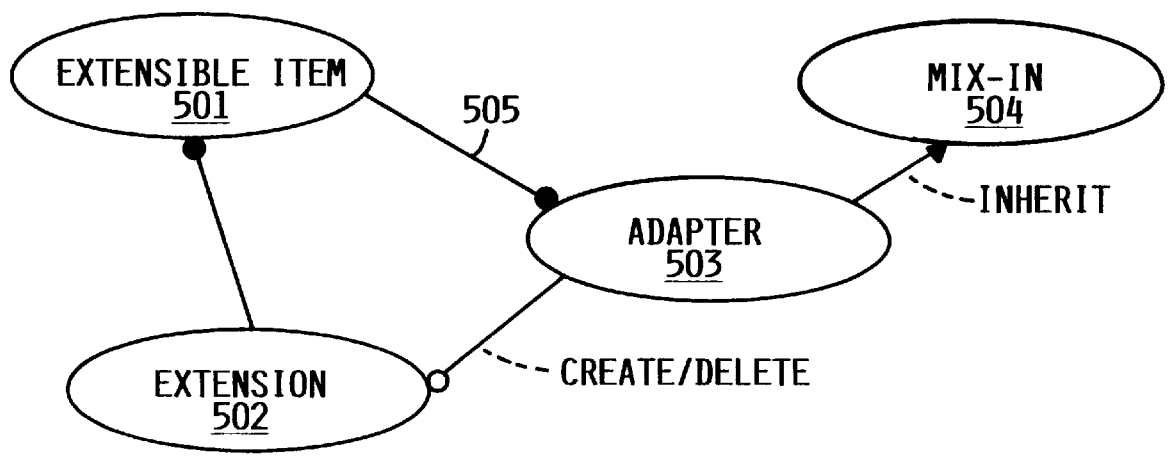
FIG. 3 shows an example according to the present invention.

FIG. 3 shows an extended example, assuming there is a need for a "pickable" order item 501 to be processed polymorphically with other "pickable" objects in the system. When the "pickable" extension 502 is added to the order item, it then creates an adapter object 503 which inherits form the polymorphically used "pickable" base class 504. This adapter object holds a reference 505 to the order item and supports the interface of the base class by using operations of that order item. If the "print pick list" method is subsequently blocked, the "pickable" extension 502 would delete its adapter 503.

Figure 4:
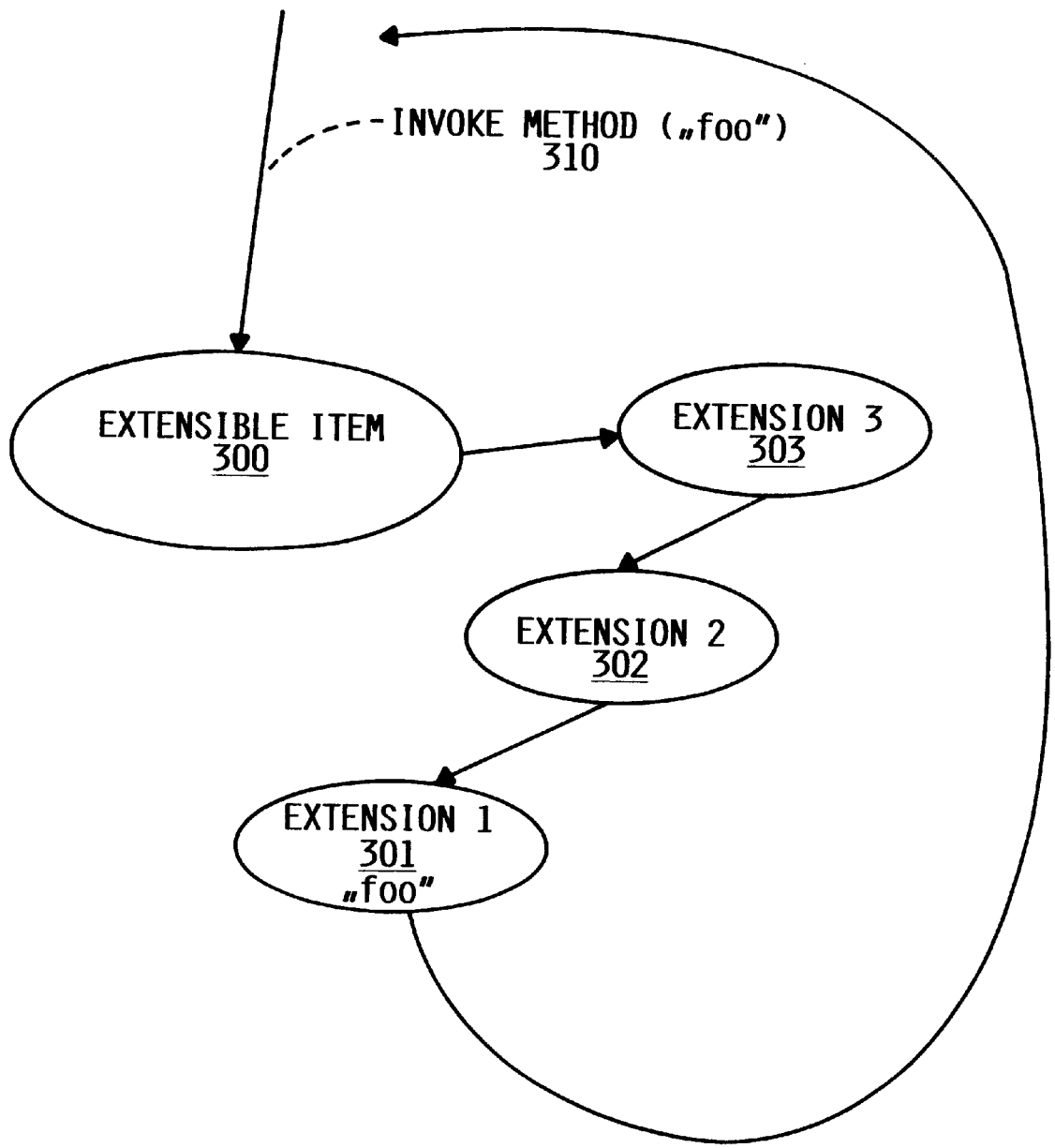
FIG. 4 shows an implementation for the Extensible Item.

FIG. 4 shows an implementation for the Extensible Item. To an Extensible Item 300 three extensions 301, 302, and 303 are added. Extension 301 is providing the method "foo". If there is an invoke method 310 received by the Extensible Item 300 requesting the method "foo", it has to go through all extensions beginning with the newest extension 303 requesting whether it can provide "foo". If the invoke method fails, it has to request the second extension 302 for "foo". Finally it has to request extension 301 in order to receive a positive answer. The first extension that provides the "foo" wins. Therefore, behavior of the extensions can be replaced or overridden along the way. This offers also the possibility to hide a function on an existing (older) extension by providing a newer extension, which will thus be requested previously with regard to the older extension. An extension, by changing itself to fail when a specific method is requested, may also temporarily hide its own function.

If the Extensible Item is part of a tree structure, i.e. attached to other Extensible Items as a parent and/or child, the request issued against the Extensible Item may be delegated either upwards or downwards in the tree structure.

Figure 5:
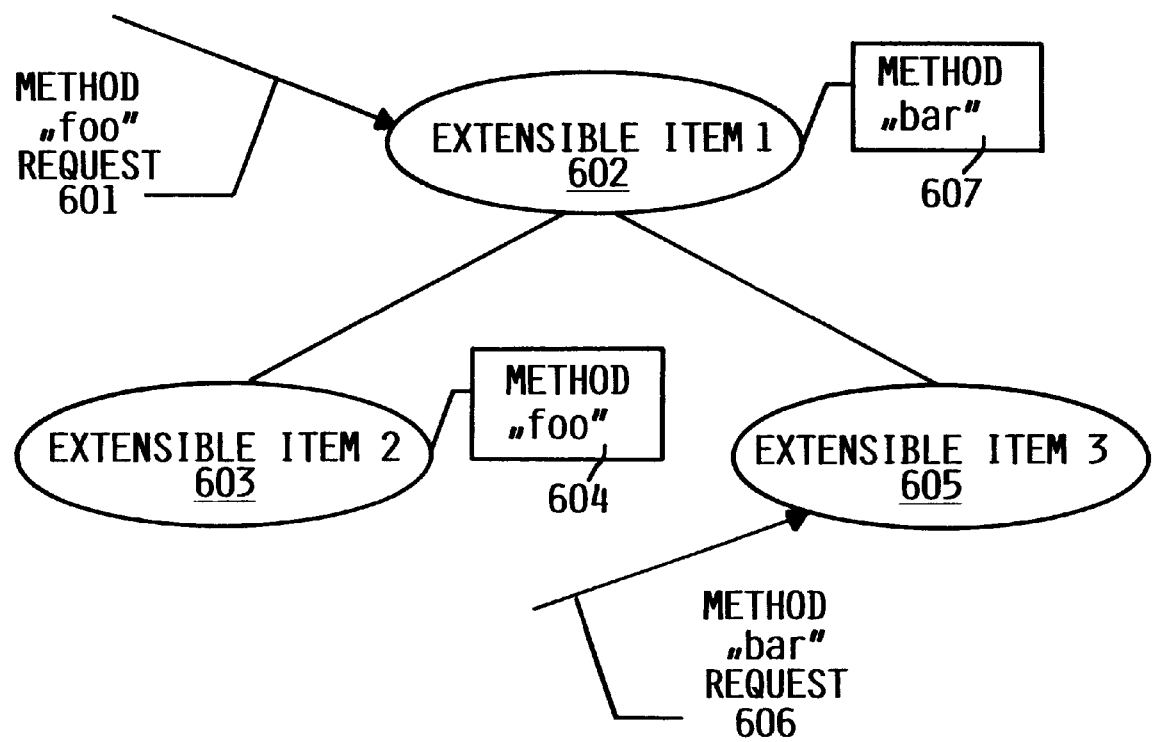
FIG. 5 shows an example wherein a method is invoked against an Extensible Item.

FIG. 5 shows an example wherein a method "foo" 601 is invoked against Extensible Item 1 602, which does not support this method. Extensible Item 1 602 can delegate invocation of method "foo" 601 to its children. Extensible Item 2 603 supports method "foo" 604 and accepts the request, while Extensible Item 3 605 does not support method "foo", so it rejects the request. Likewise, method "bar" 606 can be invoked against Extensible Item 3 605. Since Extensible Item 3 605 does not support method "bar", it can delegate this request to its parent Extensible Item 1 602, which does support the method "bar" 607. This concept of upwards and downwards delegation can be extended indefinitely throughout a tree structure of Extensible Items.

As an Extensible Item is changing its behavior during its processing, it has to go through many objects to figure out what its new interface looks like, as shown in FIG. 4 as an example for this behavior. For a particular method invocation the Extensible Item would have to go through a lot of processing and would have to ask many objects to figure out whether it could provide the requested function. To improve performance, a Dynamic Virtual Function Table (DVFT) is introduced to cache the information on the main object in a dynamic way. An invoke method is therefore able to go to the main object only and figure out which object, if any, can provide the function.

Figure 6:
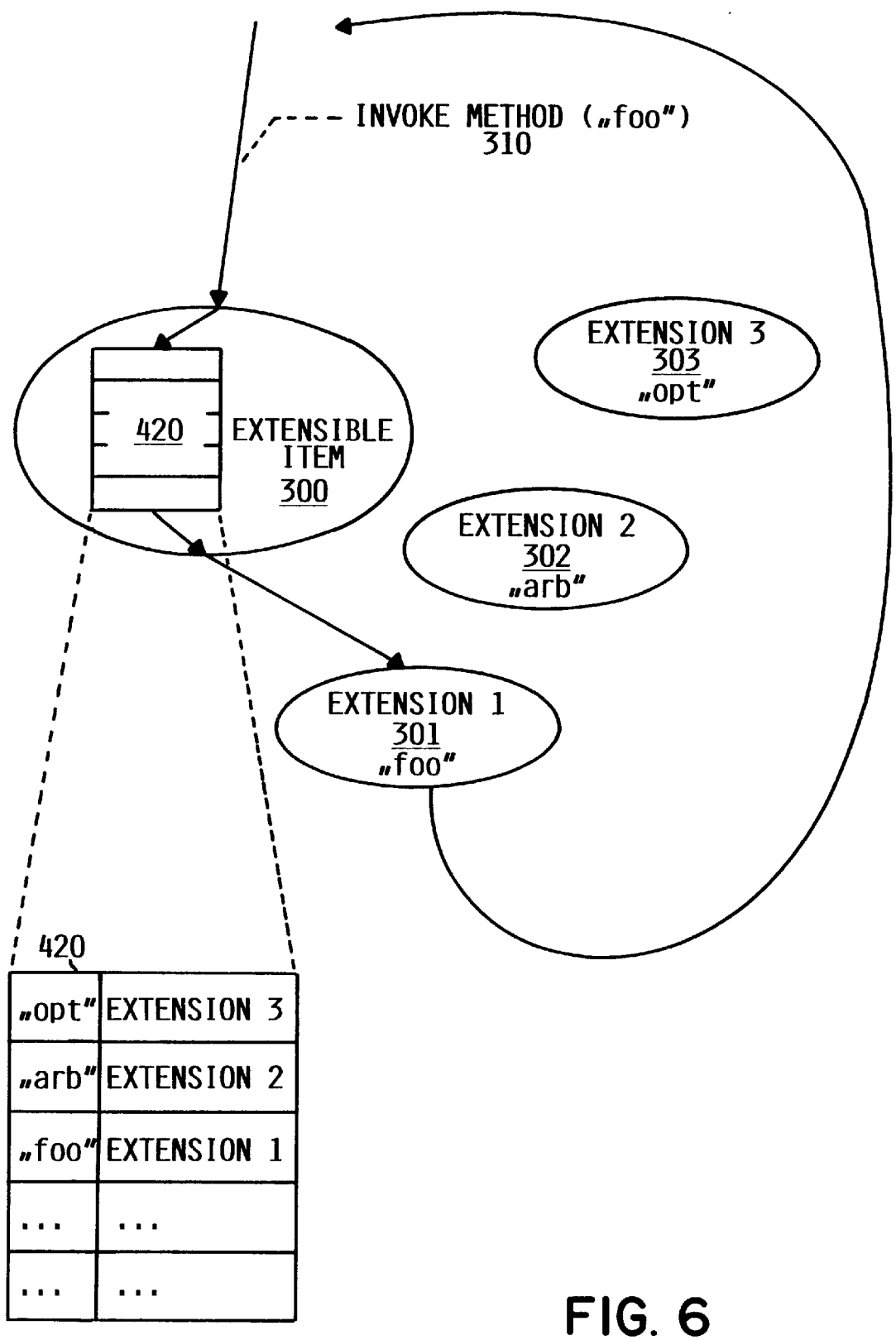
FIG. 6 shows an implementation for the Dynamic Virtual Function Table (DVFT).

FIG. 6 shows an implementation for the Dynamic Virtual Function Table (DVFT). Starting from the example shown in FIG. 4, a table is provided which caches the information whether a requested function is supported, and if yes, which extension provides the function. The Virtual Function Table 420 is located in the Extensible Item 300. Thus the invoke method searching for "foo" makes a request for which extension is providing "foo", receives the result, and goes directly to extension 1 301. The extensions can physically be located at different locations but preferably they are not.

The elements within the Virtual Function Table 420 also understand how to make the transformation from this generic interface, this invoke method, to the real interface such as "foo" in the present example, possibly by handling the parameter conversions. Therefore, the Virtual Function Table 420 not only provides a quick look-up but also does the transformation necessary to allow the function to be invoked. The Virtual Function Table 420 is dynamic since it is updated each time an extension is added, modified or removed. Contrary to some tables known in the prior art, the Dynamic Virtual Function Table (DVFT) of the present invention is not built during compile-time but during run-time as the objects are modified.

The caching of the Dynamic Virtual Function Table (DVFT) can either be maintained as the composite object is built, with updates to the Dynamic Virtual Function Table (DVFR) as each object is added or removed from the composite, or built as the objects in the composite are used, i.e. as each object in the composite is delegated to the first time, add its behavior to the Dynamic Virtual Function Table (DVFT). This solution is dynamic in that the cached information is maintained as the objects are added and removed from the composite object. Flexibility is achieved by allowing multiple objects to support or hide a particular behavior and by allowing an object to temporarily hide a behavior it supports.

The cached information is kept in a map from the behavior or method name to a set of "method nodes". A method node contains the method name, a reference to the object supporting the method, an array of the parameter types, and whether or not the method is hidden.

Figure 7:
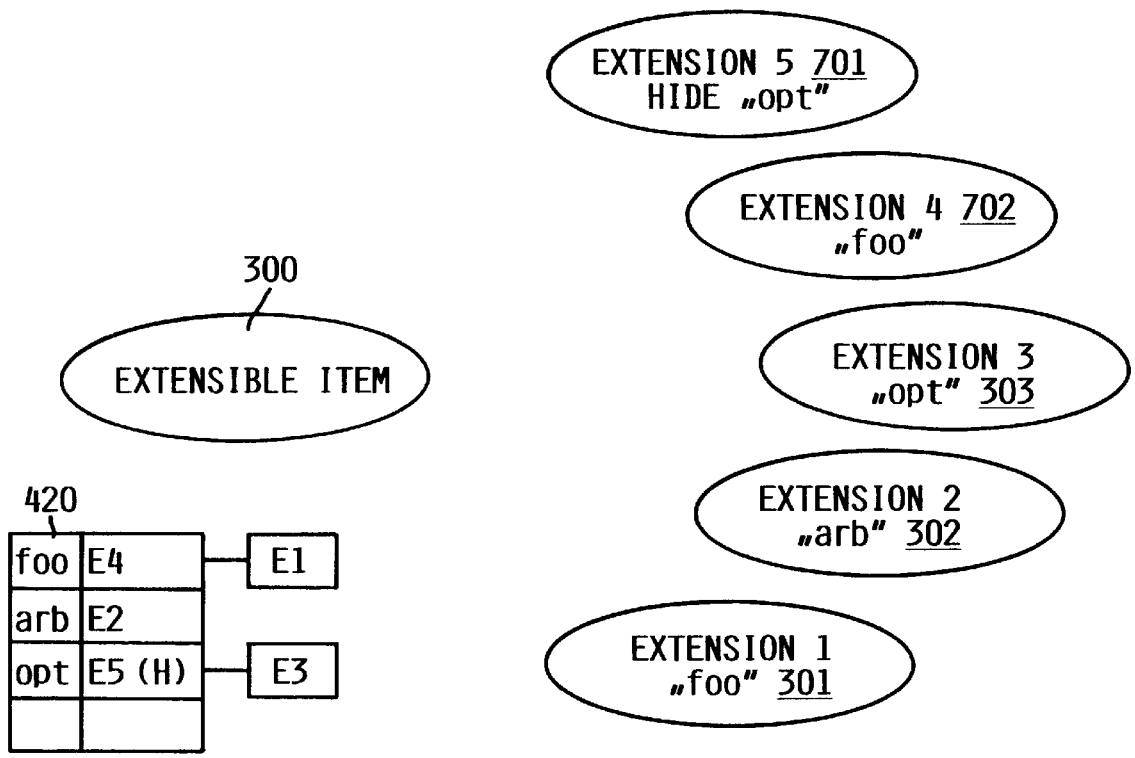
FIG. 7 shows the hiding of a method according to the present invention.

As shown in FIG. 7, a method can be hidden by either the addition of an object 701 to the composite 300 that causes the behavior or method to no longer be supported, or by an object presently supporting the method no longer supporting it. A method can be overridden by the addition of an object 702 to the composite that replaces the behavior or method.

This set is generally ordered from newest method node to oldest. When a behavior is requested, the first method node is always used (generally the newest). Since more than one object can support a method, a set of method nodes is kept. This allows an object to be removed and, in the case where another object supports that behavior, the other object's support of the behavior to be exposed. A behavior is not supported when that behavior is not represented by an entry in the map, or the method node retrieved from the map is marked as hidden.

In some cases the newest support for a method is not desired, instead a particular object's support is always to be used. In these cases so called "buoyant method nodes" can be used. "Buoyant method nodes" remain first in the set, even when other method nodes are added. For example, given method nodes M1, M2, and M3 and "buoyant method nodes" B1 and B2, if they were added in the following order: M1, B1, M2, B2, M3 the resulting set of nodes would be in order B1, B2, M3, M2, and M1.

The framework supports the creation of objects through the use of a static create method defined on a factory class, one of which is implemented for each framework class. This method returns an object cast to the JAVA interface defined for the business object. The user then interacts with the newly-created object solely via the JAVA interface from that point on. This ensures type safety from the user perspective and also hides the JAVA implementation class entirely from the user. For classes whose instances must have a unique identity, e.g. a string identifier attribute, the static create method on factory class ensures that an object instance cannot be created with a non-unique identity. Without this protection, it would be possible for the user to corrupt the persistent object state of the application.

Object ownership is a key concept in many frameworks. All objects must be owned by another object that is responsible for the owned object's Life Cycle, e.g. an owned object will be deleted when the owning object is detected. Introducing a special factory create command allows tight coupling of many business object classes to their owning class, thus ensuring that proper object ownership is established and eliminating the potential for dangling objects, which could result in persistent object memory leaks. The framework according to the present invention allows an application developer to specify the persistent location of an object, i.e. in which container in which server the persistent data for the object resides. The selection criteria for identifying object location can be quite complex. The special factory class encapsulates this complexity by introducing an abstract create method which the application can implement in a subclass of the special factory class, providing the algorithm used to determine object location. The application developer then configures the BaseFactory with an instance of this subclass. When the user creates a business object instance, the static create method on the special factory checks with the BaseFactory to determine if a special factory instance, i.e. an instance of the application-introduced subclass, exists, and if so, delegates creation responsibility to that special factory instance. Otherwise, a static factory method creates the business object using a default location, typically the owner of the created object. Thus, the user is completely isolated from the complexity of selecting an object's location.

What is claimed is:

1. An object oriented framework stored in memory for developing application software for a computer system, said framework comprising:

classes which are to be processed by the computer system;

a Life Cycle as a description of state transitions through which a Life Cycle managed item can proceed as it is processed by the application software, said Life Cycle managed item being an object instantiated from one of said classes;

wherein said Life Cycle managed item includes an extensible item which incorporates functions and provides separate dynamic function serving as mix-in.

2. An object oriented framework stored in memory for developing application software for a computer system, said framework comprising:

classes which are to be processed by the computer system;

a Life Cycle as a description of state transitions through which a Life Cycle managed item can proceed as it is processed by the application software, said Life Cycle managed item being an object instantiated from one of said classes, wherein multiple alternative Life Cycles are defined which can be applied to the Life Cycle managed items of a particular class.

3. The framework according to claim 2, wherein said alternative Life Cycles add states, remove states, and reorder state transitions.

4. An object oriented framework stored in memory for developing application software for a computer system, said framework comprising:

objects which are to be processed by the computer system;

at least one Extensible Item which breaks an interface of said objects into logical dynamically changing pieces;

wherein a client request to a target Extensible Item is delegated upwards or downwards in a tree hierarchy of said at least one Extensible Item if said target Extensible Item does not support said client request.

5. An object oriented framework stored in memory for developing application software for a computer system said framework comprising:

objects which are to be processed by the computer system;

at least one Extensible Item which breaks an interface of said objects into logical dynamically changing pieces;

a Mix-In adapter instance created by and associated with an extension contained by said at least one Extensible Item.

* * * * *